United States Patent Office

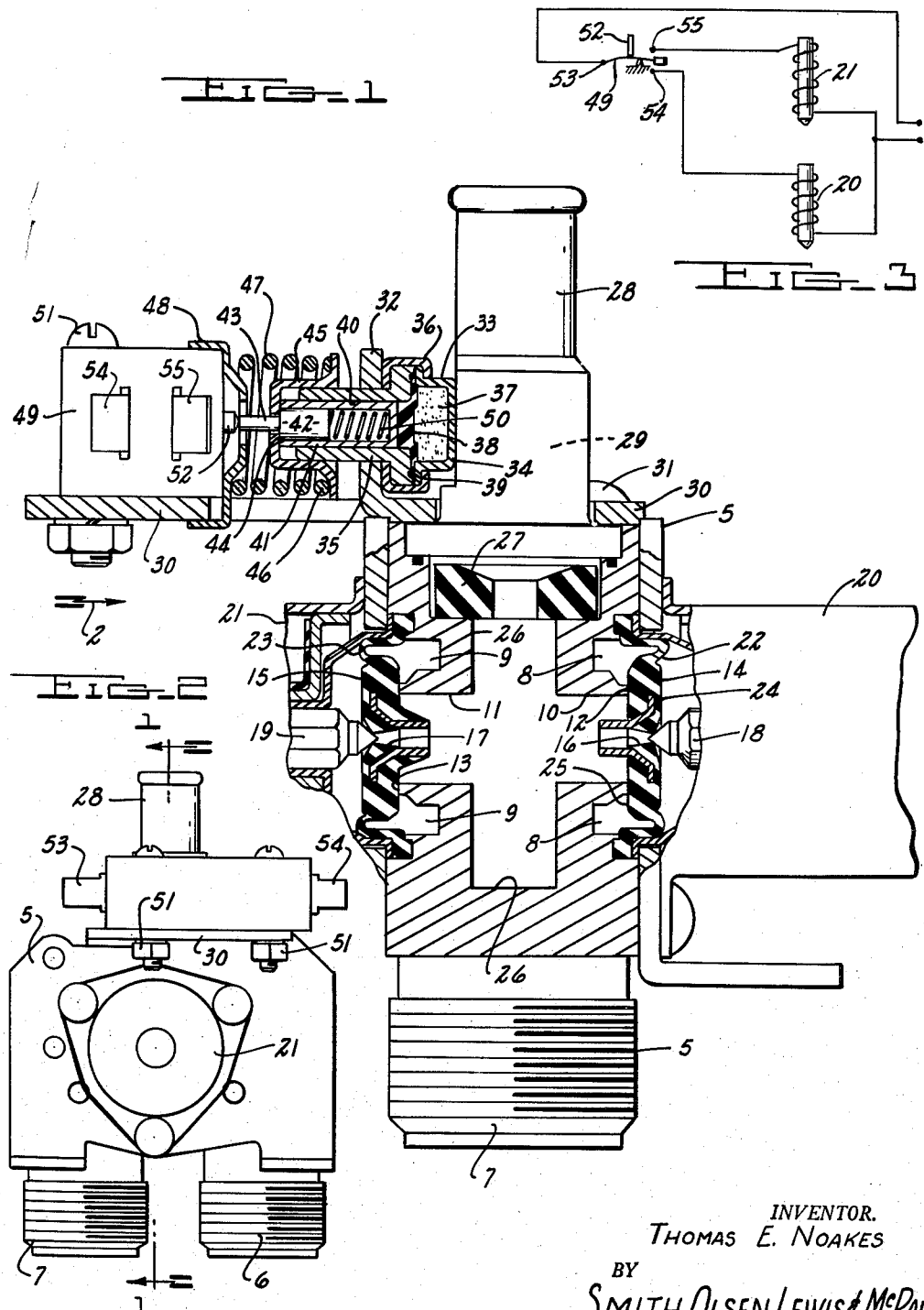

2,978,181
Patented Apr. 4, 1961

2,978,181

THERMOSTATIC MIXING VALVE AND POWER ELEMENT CONSTRUCTION

Thomas E. Noakes, Detroit, Mich., assignor, by mesne assignments, to American Radiator & Standard Sanitary Corporation, New York, N.Y., a corporation of Delaware Filed Apr. 1, 1957, Ser. No. 650,026

4 Claims. (Cl. 236—12)

This invention relates to a thermostatic power element, and to a hot-cold fluid mixing valve operated thereby.

Objects of the invention are to provide a power element and fluid mixing valve wherein:

(1) The power element exhibits "low hysteresis" operating characteristics, (2) The arrangement of the power element and valve is such that the power element can be positioned outside of the valve, thereby eliminating the need for a tight power element seal and permitting attainment of the aforementioned "low hysteresis" operation, (3) The power element incorporates economical mechanism for protecting against parts damage in the event of excessively high power element temperatures, (4) The power element exhibits long life with minimum loss of motion after extended cycles of operation, and (5) The power element has minimum drift of zero point calibration.

Other objects of this invention will appear in the following description and appended claims, reference being had to the accompanying drawings forming a part of this specification wherein like reference characters designate corresponding parts in the several views.

In the drawings:

Fig. 1 is a sectional view taken on line 1—1 in Fig. 2, and illustrating one embodiment of the invention, Fig. 2 is an elevational view of the Fig. 1 embodiment taken in the direction of arrow 2.

Fig. 3 is a diagrammatic view showing a circuit arrangement for operating the Fig. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a valve housing 5 which is contoured to define an externally threaded hot fluid inlet 6 and externally threaded cold fluid inlet 7. Housing 5 is internally configured so that inlet 6 communicates with an annular hot fluid inlet chamber 8 and inlet 7 communicates with an annular cold fluid inlet chamber 9. Passages 10 and 11 extend laterally through the valve body housing into the central wall areas encompassed by chambers 8 and 9 so as to form annular valve seats 12 and 13. Diaphragms 14 and 15 extend across chambers 8 and 9 so as to releasably close these chambers to passages 10 and 11. Each diaphragm is provided with a central opening 16 or 17 which registers with a plunger 18 or 19. Spring means (not shown, but similar to spring 52 in U.S. Patent No. 2,620,134) bias plungers 18 and 19 to positions closing openings 16 and 17. Solenoids 20 and 21, when energized, retract plungers 18 and 19 away from openings 16 and 17.

Each of the diaphragms is provided with a bleeder opening 22 or 23.

Operation of diaphragm 14 is such that when plunger 18 is in its illustrated position the fluid in chamber 8 passes through opening 22 so as to exert pressure against face 24 and thereby hold the diaphragm against seat 12. When plunger 18 is drawn away from opening 16 (by energization of solenoid 20) the fluid pressure in chamber 8 is exerted against face 25 so as to force the diaphragm away from seat 12 and thereby admit fluid to passage 10. The operation of diaphragm 15 is similar to that of diaphragm 14.

Passages 10 and 11 communicate with a mixing chamber 26 which discharges through conventional flow washer 27 into an outlet chamber 29 formed by spigot 28. It will be understood that washer 27 acts to stabilize the quantity rate of fluid flow into the outlet chamber 29 irrespective of variations in pressure within chamber 26.

Spigot 28 extends through a plate 30 which is fixedly secured on housing 5 by means of screws 31. A section 32 of plate 30 is turned at right angles to retain thermostatic power element casing 33 in fixed position against the exterior surface of spigot 28. Casing 33 is formed in two sections 34 and 35 clamped together by a clamping ring 36. A pellet 37 of wax or other thermally expansible material is contained within casing 33. Pellet 37 acts against a rubber plug 38 which is provided with an annular mounting flange 39 clamped between sections 34 and 35. Plug 38 extends into a sealing-guide bore 40 formed in casing section 35.

Bore 40 slidably houses a cylindrical cup 41 which in turn slidably houses a piston 42 having an extension 43. This extension forms a shoulder 44 which is located adjacent the outer end of cup 41. Shoulder 41 and the cup are both engaged by an annular spring retainer element 45. Element 45 extends outwardly of the power element casing to form an annular seat 46. A heavy compression spring 47 is seated between seat 46 and a pressure plate 48 which is positioned against switch housing 49. A light compression spring 50 is positioned between the bottom wall of cup 41 and piston 42.

Switch housing 49 is fixedly secured on plate 30 by means of two bolt-nut assemblies 51. Within housing 49 there is positioned a switch blade which is moved between two limiting positions by an actuator button 52 under the control of piston 42. In one of its positions the switch blade completes a circuit across terminals 53 and 54 which energizes hot fluid cylinder 20. In its other position the switch blade completes a circuit across terminals 53 and 55 which energizes cold fluid cylinder 21.

The operation of the switch structure is such that when the outlet fluid in spigot 28 is at a relatively low temperature pellet 37 is in a contracted state. Actuator button 52 is in a position completing the circuit between terminals 53 and 54; solenoid 20 is thereby energized to open diaphragm 14 and admit hot fluid into chamber 26. As a result the outlet fluid temperature is raised so as to expand pellet 37 and move cup 41 outwardly of casing 33.

Cup 41 moves retainer element 45 to the left so as to allow light spring 50 to bias piston 42 and actuator button 52 in the same direction. As a result the switch blade is moved to complete the circuit between terminals 53 and 55, thereby energizing cold fluid solenoid 21 so as to open diaphragm 15 and admit cold fluid into chamber 26.

The alternate operation of solenoids 20 and 21 cooperates with flow washer 27 to control the average temperature of the fluid discharged from spigot 28. High and low spigot temperatures may be obtained by utilizing additional control circuits and timer mechanisms for solenoids 20 and 21. If desired solenoids 20 and 21 may be simultaneously operated (by electric circuitry not shown) to simultaneously admit hot and cold fluids through passages 10 and 11; with this method of operation there is minimum temperature fluctuation of the fluid issuing from spigot 28.

The operation of power element 33 is such that excessively high fluid temperatures in outlet chamber 29 may expand pellet 37 so as to move cup 41 quite far out in bore 40. Retainer element 45 is moved a corresponding distance, but piston 42 is prevented from further outward movement by actuator button 52. Light spring 50 is compressed, but the strength of this spring is not so great as to damage the switch components. In the illustrated embodiment the normal movement of sleeve 41 necessary to actuate button 52 is about .015 inch; any additional movement of sleeve 41 is taken up by spring 50.

It will be noted that bore 40 is of uniform diameter along its entire length; i.e. there is no tapering bore section for squeezing the sealing plug 38 during expansive movement of pellet 37. As a result the plug offers fairly low resistance to bodily movement back and forth in bore 40. This feature contributes toward "low hysteresis" power element operating characteristics, with minimum loss of motion after extended cycles of operation and minimum drift of zero point calibration. The design of power element 33 is made possible by the fact that the element operates in the external atmosphere where sealing problems are not too acute, rather than within the valve housing where sealing problems are such as to require a squeezing of the sealing plug to effect a sealing action. As an additional factor permitting the instant power element design it should be noted that actuation of the illustrated switch requires a piston movement of about .015 inch, whereas direct actuation of a valve by a power element located within the valve housing requires a piston movement in the neighborhood of .030 inch. Such an increased piston movement requires a corresponding increase in sealing plug movement (by a squeezing action in a tapering bore and/or an increased axial movement). With the present design of power element, and arrangement thereof with respect to the valve housing, the plug movement and plug wear is maintained at a minimum, which tends to give the aforementioned operating characteristics of "low hysteresis," "minimum loss of motion" and long power element life.

I claim:

1. The combination comprising a valve housing internally contoured to define a hot fluid inlet chamber, a cold fluid inlet chamber, a mixing chamber communicating with both of said inlet chambers, and an outlet chamber downstream from the mixing chamber; a diaphragm for releasably closing said mixing chamber to said hot fluid chamber; solenoid means for controlling the position of said diaphragm; a second diaphragm for releasably closing said mixing chamber to said cold fluid chamber; second solenoid means for controlling the position of said second diaphragm; a thermostatic power element casing positioned against the wall of said outlet chamber; thermally expansible material within said casing; a piston extended from said casing and subject to the expansive force of said thermally expansible material; switch means for controlling the operation of the first and second solenoid means; switch-actuator means operated by said piston; a cup surrounding the piston and slidably positioned in the power element casing; a light spring between the cup bottom wall and piston; a reduced diameter extension formed on said piston to define a shoulder; said extension being engaged with the switch actuator means; an annular spring retainer element engaging said shoulder and outer end of the cup, said retainer element extending outwardly of the cup to define an annular seat; and a heavy compression spring positioned between the switch and annular seat so as to bias the piston and cup into the power element casing; whereby initial expansion of the expansible material moves the cup and piston outwardly of the casing to force the actuator means into the switch, and final expansion of the expansible material moves the cup and retainer element outwardly of the casing without any movement of the piston; the valve action being such that high fluid temperatures in the outlet chamber cause the piston to expand out of the power element casing so as to operate the first solenoid for closing the first diaphragm and thereby restricting the flow of hot fluid into the mixing chamber, and cold fluid temperatures in the outlet chamber cause the piston to retract into the power element casing so as to operate the second solenoid for closing the second diaphragm and thereby restricting the flow of cold fluid into the mixing chamber.

2. The combination comprising a valve housing internally contoured to define an annular hot fluid inlet chamber, an annular cold fluid inlet chamber, a mixing chamber, passages extending through the central walls encompassed by the annular chambers to interconnect said mixing chamber with both of said inlet chambers, and an outlet chamber downstream from the mixing chamber; a diaphragm extending across the hot fluid chamber for releasably closing the adjacent passage; solenoid means for controlling the position of said diaphragm; a second diaphragm extending across the cold fluid chamber for releasably closing the adjacent passage; second solenoid means for controlling the position of said second diaphragm; a thermostatic power element casing positioned against the wall of said outlet chamber; thermally expansible material within said casing; a piston extended from said casing and subject to the expansive force of said thermally expansible material; switch means for controlling the operation of the first and second solenoid means; and switch-actuator means operated by said piston; a cup surrounding the piston and slidably positioned in the power element casing; a light spring between the cup bottom wall and piston; a reduced diameter extension formed on said piston to define a shoulder; said extension being engaged with the switch actuator means; an annular spring retainer element engaging said shoulder and outer end of the cup; said retainer element extending outwardly of the cup to define an annular seat; and a heavy compression spring positioned between the switch and annular seat so as to bias the piston and cup into the power element casing; whereby initial expansion of the expansible material moves the cup and piston outwardly of the casing to force the actuator means into the switch, and final expansion of the expansible material moves the cup and retainer element outwardly of the casing without any movement of the piston; the valve action being such that high fluid temperatures in the outlet chamber cause the piston to expand out of the power element casing so as to operate the first solenoid for closing the first diaphragm and thereby restricting the flow of hot fluid into the mixing chamber, and cold fluid temperatures in the outlet chamber cause the piston to retract into the power element casing so as to operate the second solenoid for closing the second diaphragm and thereby restricting the flow of cold fluid into the mixing chamber.

3. The combination comprising a power element casing; thermally expansible material within said casing; a cup slidably extended from said casing; a piston slidably positioned in said cup; a light compression spring between the cup bottom wall and piston; a reduced diameter extension formed on said piston to define a shoulder adjacent the outer end of the cup; an annular spring retainer element having a first annular portion engaging said shoulder and cup outer end, a tubular portion extending from said first annular portion along the outer surface of the power element casing, and a second annular portion radiating from said tubular portion to define an annular seat; a switch housing positioned adjacent the power element casing and having an actuator button engaged with the piston extension; and a heavy compression spring positioned between the switch housing and annular seat so as to bias the piston and cup into the power element casing; whereby initial expansion of the expansible material moves the cup and piston outwardly to move the button into the switch housing, and final expansion of the expansible material moves the cup and retainer outwardly without any movement of the piston, thereby protecting against overtravel damage.

4. The combination comprising a valve housing internally contoured to define a hot fluid inlet chamber, a cold fluid inlet chamber, and a common chamber communicating with both of said inlet chambers; a spigot structure carried by the valve housing for receiving fluid from the common chamber; a valve element for releasably closing said common chamber to said hot fluid chamber; solenoid means for controlling the position of said valve element; a second valve element for releasably closing said common chamber to said cold fluid chamber; second solenoid means for controlling the position of said second valve element; an external plate-like bracket having an opening therethrough arranged so that the bracket fits onto the valve housing with said spigot structure projecting through the opening; said plate-like bracket extending transverse to the spigot structure and having an apertured plate-like arm structure projecting in spaced parallelism with the spigot structure; a thermostatic power element casing including a container portion engaged with the spigot structure, thermally expansible material within said container portion, a piston guide structure extending from the container portion through the aperture of the arm structure in snug relation therewith so as to prevent displacement of the power element casing, and piston means slidably carried in the guide structure; switch means including a switch housing secured on the aforementioned bracket for controlling the operation of the first and second solenoid means; and a switch-actuator button projecting from the switch housing into engagement with the piston means; whereby high fluid temperatures in the spigot structure cause the piston means to move out of the power element casing so as to operate the first solenoid means for closing the first valve element and thereby restricting the flow of hot fluid into the common chamber, and low fluid temperatures in the spigot structure cause the piston means to retract into the power element casing so as to operate the second solenoid means for closing the second valve element and thereby restricting the flow of cold fluid into the common chamber.

References Cited in the file of this patent

UNITED STATES PATENTS

| | | |
|---|---|---|
| 875,957 | Saugstad | Jan. 7, 1908 |
| 2,280,667 | Scott et al. | Apr. 21, 1942 |
| 2,368,182 | Vernet | Jan. 30, 1945 |
| 2,510,473 | Jensen | June 6, 1950 |
| 2,514,881 | Leupold | July 11, 1950 |
| 2,532,896 | Dillman | Dec. 5, 1950 |
| 2,712,324 | Lund | July 5, 1955 |
| 2,785,132 | Frey | Mar. 12, 1957 |
| 2,799,750 | Kovach | July 16, 1957 |
| 2,830,766 | Algino | Apr. 15, 1958 |
| 2,844,320 | Cate | July 22, 1958 |